US012786997B2

(12) United States Patent
Mondet et al.

(10) Patent No.: US 12,786,997 B2
(45) Date of Patent: Nov. 3, 2026

(54) POWER EFFICIENT TRANSMISSION

(71) Applicant: QUALCOMM Incorporated, San Diego, CA (US)

(72) Inventors: Mickael Mondet, Louannec (FR); Ravi Agarwal, San Diego, CA (US); Prashanth Haridas Hande, San Diego, CA (US); Peerapol Tinnakornsrisuphap, San Diego, CA (US); Hyun Yong Lee, San Diego, CA (US); Zhichao Zhou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 18/699,158

(22) PCT Filed: Dec. 10, 2021

(86) PCT No.: PCT/CN2021/136996
§ 371 (c)(1),
(2) Date: Apr. 5, 2024

(87) PCT Pub. No.: WO2023/102876
PCT Pub. Date: Jun. 15, 2023

(65) Prior Publication Data

US 2024/0414706 A1 Dec. 12, 2024

(51) Int. Cl.
*H04W 72/1268* (2023.01)
*H04W 52/14* (2009.01)
*H04W 76/28* (2018.01)

(52) U.S. Cl.
CPC ..... *H04W 72/1268* (2013.01); *H04W 52/143* (2013.01); *H04W 52/146* (2013.01); *H04W 76/28* (2018.02)

(58) Field of Classification Search
CPC ........... H04W 52/0235; H04W 52/143; H04W 52/146; H04W 52/0216; H04W 52/0229;
(Continued)

(56) References Cited

U.S. PATENT DOCUMENTS

2014/0064160 A1 3/2014 Verger et al.
2015/0296507 A1 10/2015 Kneckt et al.
(Continued)

OTHER PUBLICATIONS

CATT: "Views on Rel-18 XR", 3GPP Draft, 3GPP TSG RAN Meeting #93-e, RP-212252, 3rd Generation Partnership Project, Mobile Competence Centre, 650, Route Des Lucioles, F-06921 Sophia-Antipolis Cedex, France, vol. TSG RAN, No. Electronic Meeting, Sep. 13, 2021-Sep. 17, 2021, Sep. 6, 2021, XP052049527, 8 pages, p. 3-p. 5.
(Continued)

*Primary Examiner* — Brian D Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive uplink frames delivered from an application of the UE. The UE may transmit a message that indicates one or more of a cadence of the uplink frames or an offset of each of the uplink frames. The UE may receive an uplink transmission configuration that indicates that uplink transmission occasions of the UE are to overlap with power efficient opportunities. The UE may transmit uplink transmissions for the uplink frames at the uplink transmission occasions according to the uplink transmission configuration. Numerous other aspects are described.

30 Claims, 10 Drawing Sheets

(58) Field of Classification Search
CPC ............... H04W 76/28; H04W 52/028; H04W 52/0219; H04W 72/1268; Y02D 30/70
See application file for complete search history.

(56) References Cited

U.S. PATENT DOCUMENTS

| | | | | |
|---|---|---|---|---|
| 2017/0150493 | A1* | 5/2017 | Seok | H04B 7/0452 |
| 2018/0242317 | A1 | 8/2018 | Marinier et al. | |
| 2019/0068317 | A1 | 2/2019 | Babaei et al. | |
| 2020/0404604 | A1 | 12/2020 | Hande et al. | |
| 2021/0227528 | A1* | 7/2021 | Bang | H04L 5/0053 |
| 2024/0172049 | A1* | 5/2024 | Yang | H04W 76/20 |
| 2024/0349187 | A1* | 10/2024 | Lee | H04W 52/02 |
| 2024/0357618 | A1* | 10/2024 | Park | H04W 28/0268 |
| 2024/0406891 | A1* | 12/2024 | Kim | H04W 56/001 |
| 2025/0142669 | A1* | 5/2025 | Park | H04L 1/1848 |

OTHER PUBLICATIONS

Qualcomm Incorporated: "Potential Enhancements for XR", 3GPP Draft, 3GPP TSG RAN WG1 #106-e, R1-2107377, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038320, 12 pages, section 2.4, p. 4-p. 5, section 2.5, p. 5-p. 6, section 2.6, p. 6, section 3.1, p. 7.

Supplementary European Search Report—EP21966798—Search Authority—The Hague—Jul. 30, 2025.

International Search Report and Written Opinion—PCT/CN2021/136996—ISA/EPO—Aug. 25, 2022.

Qualcomm Incorporated: "Potential Enhancements for XR", 3GPP TSG RAN WG1 #107-e, R1-2112245, Mobile Competence Centre, 650, Route Des Lucioles, F-06921, Sophia- Antipolis Cedex, France, vol. RAN WG1, No. e-Meeting, Nov. 11, 2021-ng, Nov. 19, 2021, Nov. 6, 2021, pp. 1-20, XP052075351, p. 4,14, Sec 2.6, p. 6, Sec 3.4, p. 12-13, Sec 3.8, p. 17-18, Sec 2.1 CDRX Enhancement, Sec 2.2 Enhancements for Jitter handling, Sec 2.3 Enhancements to L1-based Signaling to be Further Closer to "Genie" Performance, Sec 2.4 UL&DL Alignment.

VIVO: "Summary of AI 8.14.4 for XR", R1-2106038, 3GPP TSG-RAN WG1 Meeting #105-e, May 27, 2021 (May 27, 2021), 9 Pages, The Whole Document.

* cited by examiner

POWER EFFICIENT TRANSMISSION

CROSS-REFERENCE TO RELATED APPLICATION

This Patent Application is a 371 national stage of PCT Application No. PCT/CN2021/136996 filed on Dec. 10, 2021, entitled "POWER EFFICIENT TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power efficient transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving uplink frames delivered from an application of the UE. The method may include transmitting a message that indicates one or more of a cadence of the uplink frames or an offset of each of the uplink frames. The method may include receiving an uplink transmission configuration that indicates that uplink transmission occasions of the UE are to overlap with power efficient opportunities. The method may include transmitting uplink transmissions for the uplink frames at the uplink transmission occasions according to the uplink transmission configuration.

Some aspects described herein relate to a method of wireless communication performed by a base station. The method may include receiving, from a UE, a message that indicates one or more of a cadence of uplink frames for an application of the UE or an offset of each of the uplink frames. The method may include generating an uplink transmission configuration for the UE based at least in part on the one or more of the cadence of the uplink frames or the offset for each of the uplink frames, such that uplink transmission occasions of the UE overlap with power efficient opportunities. The method may include transmitting the uplink transmission configuration to the UE. The method may include receiving uplink transmissions at the uplink transmission occasions according to the uplink transmission configuration.

Some aspects described herein relate to a UE for wireless communication. The UE may include a memory and one or more processors coupled to the memory. The one or more processors may be configured to receive uplink frames delivered from an application of the UE. The one or more processors may be configured to transmit a message that indicates one or more of a cadence of the uplink frames or an offset of each of the uplink frames. The one or more processors may be configured to receive an uplink transmission configuration that indicates that uplink transmission occasions of the UE are to overlap with power efficient opportunities. The one or more processors may be configured to transmit uplink transmissions for the uplink frames at the uplink transmission occasions according to the uplink transmission configuration.

Some aspects described herein relate to a base station for wireless communication. The base station may include a memory and one or more processors coupled to the memory. The one or more processors may be configured to receive, from a UE, a message that indicates one or more of a cadence of uplink frames for an application of the UE or an offset of each of the uplink frames. The one or more processors may be configured to generate an uplink transmission configuration for the UE based at least in part on the one or more of the cadence of the uplink frames or the offset for each of the uplink frames, such that uplink transmission occasions of the UE overlap with power efficient opportunities. The one or more processors may be configured to transmit the uplink transmission configuration to the UE. The one or more processors may be configured to receive uplink transmissions at the uplink transmission occasions according to the uplink transmission configuration.

Some aspects described herein relate to a non-transitory computer-readable medium that stores a set of instructions for wireless communication by a UE. The set of instructions, when executed by one or more processors of the UE, may cause the UE to receive uplink frames delivered from an application of the UE. The set of instructions, when executed by one or more processors of the UE, may cause the UE to transmit a message that indicates one or more of a cadence of the uplink frames or an offset of each of the uplink frames.

The set of instructions, when executed by one or more processors of the UE, may cause the UE to receive an uplink transmission configuration that indicates that uplink transmission occasions of the UE are to overlap with power efficient opportunities. The set of instructions, when executed by one or more processors of the UE, may cause the UE to transmit uplink transmissions for the uplink frames at the uplink transmission occasions according to the uplink transmission configuration.

Some aspects described herein relate to a non-transitory computer-readable medium that stores a set of instructions for wireless communication by a base station. The set of instructions, when executed by one or more processors of the base station, may cause the base station to receive, from a UE, a message that indicates one or more of a cadence of uplink frames for an application of the UE or an offset of each of the uplink frames. The set of instructions, when executed by one or more processors of the base station, may cause the base station to generate an uplink transmission configuration for the UE based at least in part on the one or more of the cadence of the uplink frames or the offset for each of the uplink frames, such that uplink transmission occasions of the UE overlap with power efficient opportunities. The set of instructions, when executed by one or more processors of the base station, may cause the base station to transmit the uplink transmission configuration to the UE. The set of instructions, when executed by one or more processors of the base station, may cause the base station to receive uplink transmissions at the uplink transmission occasions according to the uplink transmission configuration.

Some aspects described herein relate to an apparatus for wireless communication. The apparatus may include means for receiving uplink frames delivered from an application of the apparatus. The apparatus may include means for transmitting a message that indicates one or more of a cadence of the uplink frames or an offset of each of the uplink frames. The apparatus may include means for receiving an uplink transmission configuration that indicates that uplink transmission occasions of the apparatus are to overlap with power efficient opportunities. The apparatus may include means for transmitting uplink transmissions for the uplink frames at the uplink transmission occasions according to the uplink transmission configuration.

Some aspects described herein relate to an apparatus for wireless communication. The apparatus may include means for receiving, from a UE, a message that indicates one or more of a cadence of uplink frames for an application of the UE or an offset of each of the uplink frames. The apparatus may include means for generating an uplink transmission configuration for the UE based at least in part on the one or more of the cadence of the uplink frames or the offset for each of the uplink frames, such that uplink transmission occasions of the UE overlap with power efficient opportunities. The apparatus may include means for transmitting the uplink transmission configuration to the UE. The apparatus may include means for receiving uplink transmissions at the uplink transmission occasions according to the uplink transmission configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
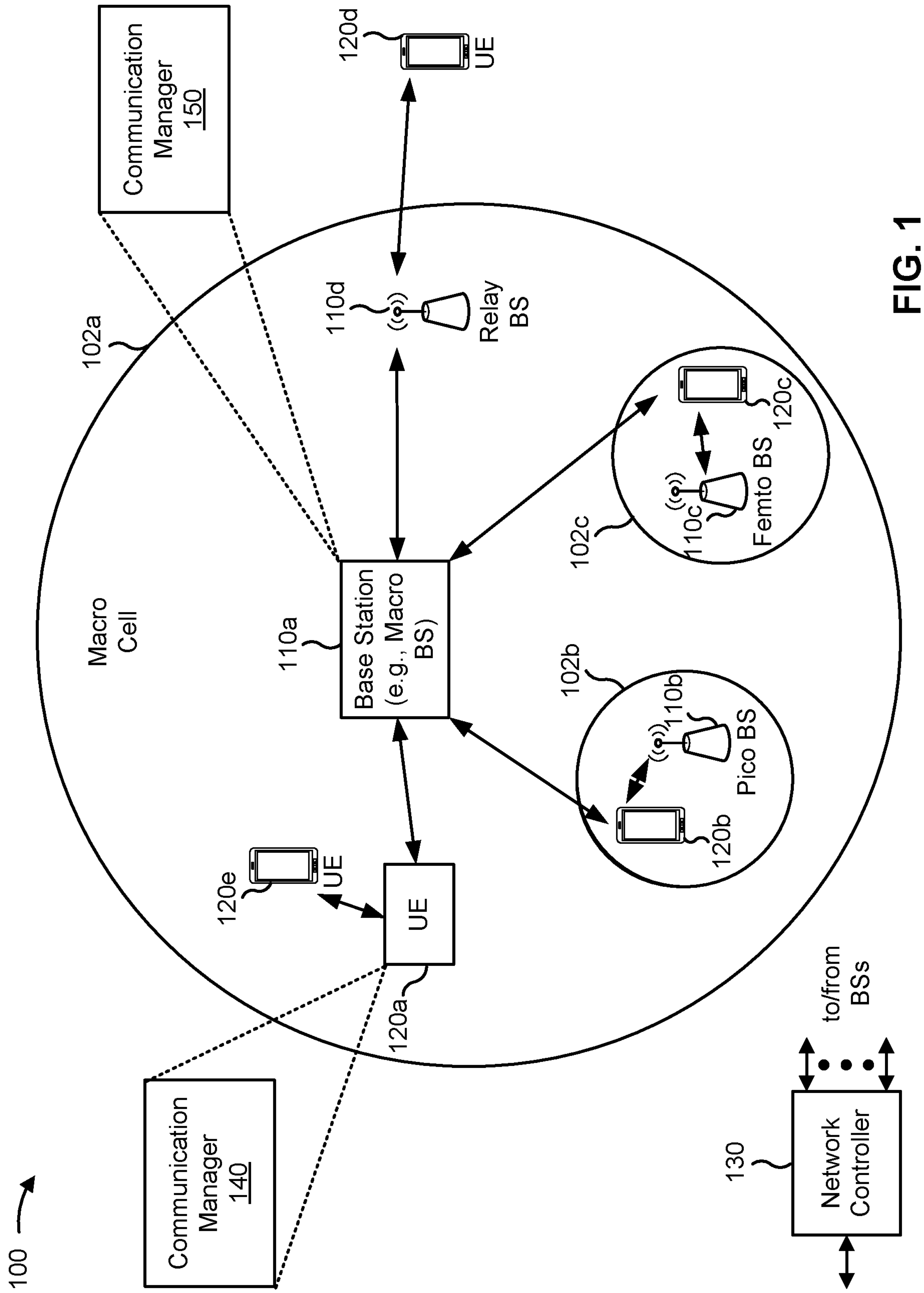
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive uplink frames delivered from an application of the UE, and transmit a message that indicates one or more of a cadence of the uplink frames or an offset of each of the uplink frames. The communication manager 140 may receive an uplink transmission configuration that indicates that uplink transmission occasions of the UE are to overlap with power efficient opportunities, and transmit uplink transmissions for the uplink frames at the uplink transmission occasions according to the uplink transmission configuration. Additionally, or alternatively, the communication manager 140 may perform one or more other operations described herein.

In some aspects, the base station 110 may include a communication manager 150. As described in more detail elsewhere herein, the communication manager 150 may receive, from a UE, a message that indicates one or more of a cadence of uplink frames for an application of the UE or an offset of each of the uplink frames, and generate an uplink transmission configuration for the UE based at least in part on the one or more of the cadence of the uplink frames or the offset for each of the uplink frames, such that uplink transmission occasions of the UE overlap with power efficient opportunities. The communication manager 150 may transmit the uplink transmission configuration to the UE and receive uplink transmissions at the uplink transmission occasions according to the uplink transmission configuration. Additionally, or alternatively, the communication manager 150 may perform one or more other operations described herein.

As indicated above, FIG. 1 is provided as an example. Other examples may differ from what is described with regard to FIG. 1.

Figure 2:
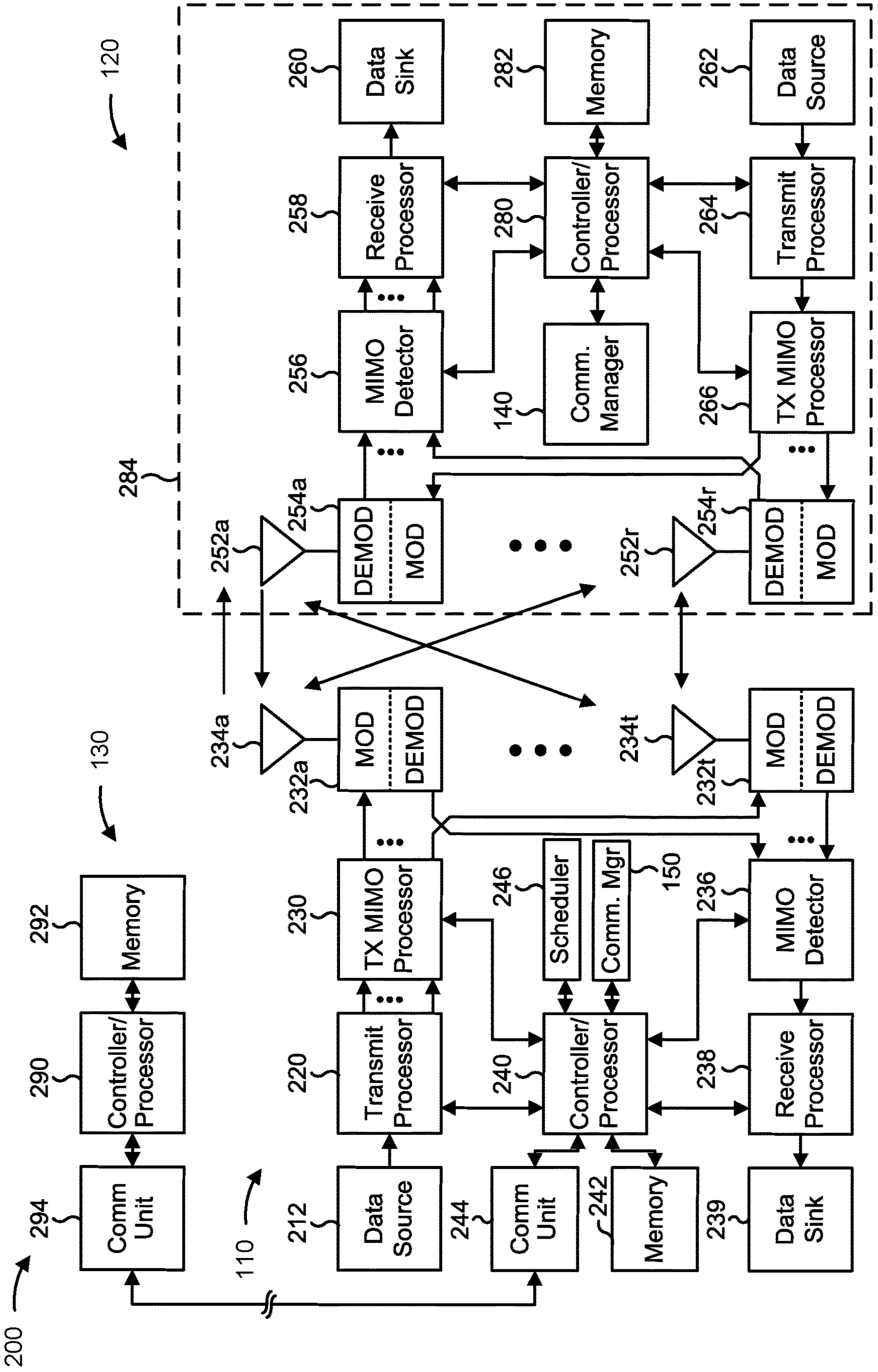
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with power efficient transmission occasions, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving uplink frames delivered from an application of the UE 120; means for transmitting a message that indicates one or more of a cadence of the uplink frames or an offset of each of the uplink frames; means for receiving an uplink transmission configuration that indicates that uplink transmission occasions of the UE 120 are to overlap with power efficient opportunities; and/or means for transmitting uplink transmissions for the uplink frames at the uplink transmission occasions according to the uplink transmission configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE, a message that indicates one or more of a cadence of uplink frames for an application of the UE or an offset of each of the uplink frames; means for generating an uplink transmission configuration for the UE based at least in part on the one or more of the cadence of the uplink frames or the offset for each of the uplink frames, such that uplink transmission occasions of the UE overlap with power efficient opportunities; means for transmitting the uplink transmission configuration to the UE; and/or means for receiving uplink transmissions at the uplink transmission occasions according to the uplink transmission configuration. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
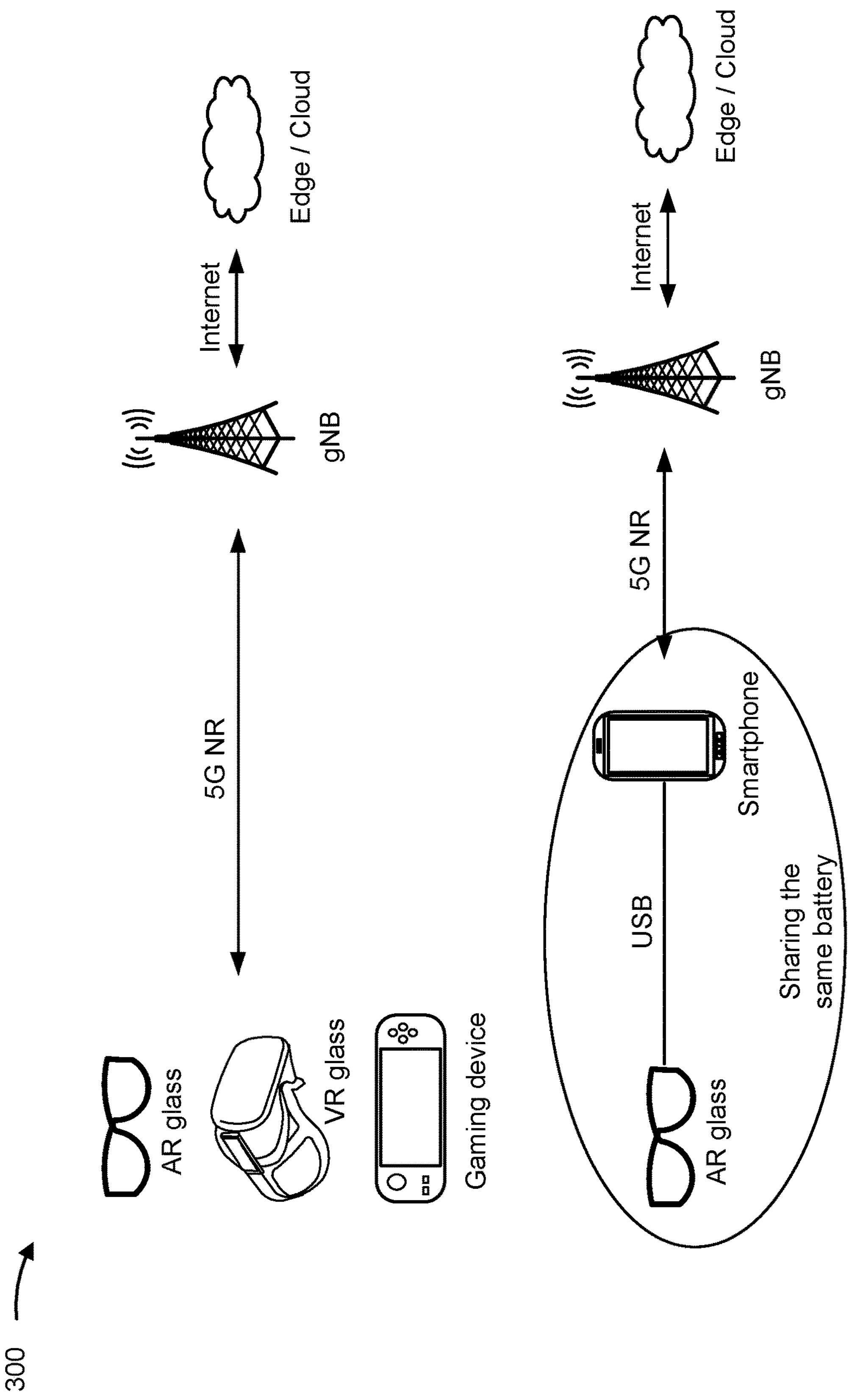
FIG. 3 is a diagram illustrating an example of devices designed for low latency applications, in accordance with the present disclosure.

FIG. 3 is a diagram illustrating an example 300 of devices designed for low latency applications, in accordance with the present disclosure.

Some devices, including devices for extended reality (XR), may require low-latency traffic to and from an edge server or a cloud environment. Example 300 shows communications between an XR device and the edge server or the cloud environment, via a base station (e.g., gNB). The XR device may be an augmented reality (AR) glasses device, a virtual reality (VR) glass device, or a gaming device. XR devices may have limited battery capacity. Battery power is an issue even when the XR device is tethered to a smartphone and uses the same smartphone battery.

As indicated above, FIG. 3 is provided as an example. Other examples may differ from what is described with regard to FIG. 3.

Figure 4:
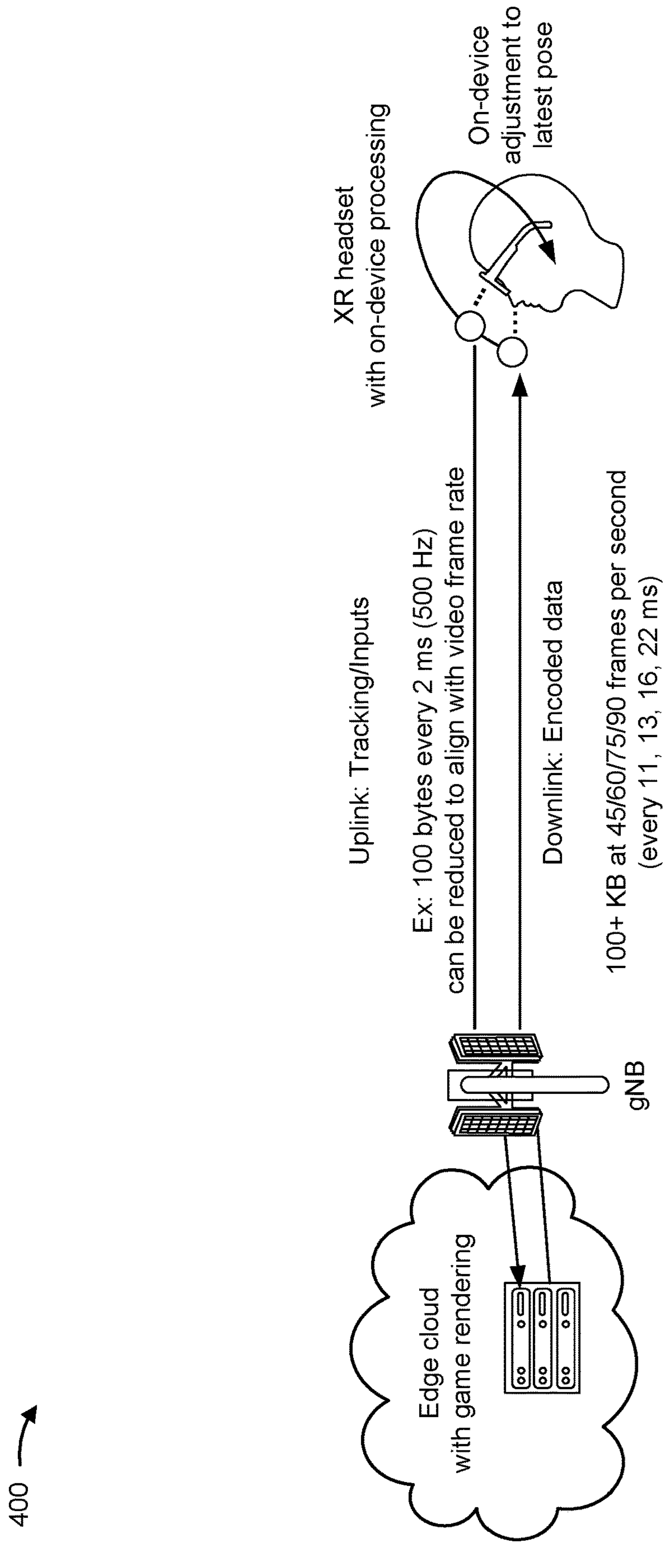
FIG. 4 is a diagram illustrating an example of low-latency traffic and power states, in accordance with the present disclosure.

FIG. 4 is a diagram illustrating an example 400 of low-latency traffic and power states, in accordance with the present disclosure.

Power dissipation may be reduced by limiting an amount of time that processing resources of the XR device are active for computations and power consumption. Some wireless communications systems may a support a UE, such as the XR device, that operates in a discontinuous reception (DRX) mode. A UE in a DRX mode may transition between a sleep state for power conservation and an active state for data transmission and reception. The active state for data transmission and reception may be referred to as a DRX "ON-duration." A UE that uses different DRX cycles may have non-uniform cycle durations within a DRX time period. Such non-uniform cycle durations may provide DRX ON-durations that are aligned with a periodicity of downlink traffic to the UE. In some cases, the DRX time period may correspond to an anchor cycle that spans a set of DRX cycles, and a subset of the set of DRX cycles may have a different cycle duration than other DRX cycles of the set of DRX cycles. In some cases, an ON-duration offset value may be indicated for one or more DRX cycles within the DRX time period (e.g., via downlink control information (DCI) or a medium access control control element (MAC-CE)).

By offloading some computations to an edge server, an XR device may save processing resources. Example 400 shows a scenario where an XR device may split computations for an application with the edge server on the other side of a base station. The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources. XR downlink traffic (e.g., video frames) may have a periodic pattern that corresponds to a frame rate of transmitted video data (e.g., H.264/H.265 encoded video). Such downlink traffic may be quasi-periodic with a data burst every frame at one frame-per-second (1/fps), or two possibly staggered “eye-buffers” per frame at 1/(2*fps). For example, XR downlink traffic may include 100+ kilobytes (KB) of data for 45, 60, 75, or 90 frames per second (e.g., every 11 ms, 13 ms, 16 ms, or 22 ms). XR uplink traffic may include controller information for gaming, information for VR split rendering, and/or the user pose information. The XR uplink traffic may include 100 bytes every 2 ms (500 Hz). The XR device may reduce this periodicity to align the XR uplink traffic with the XR downlink traffic.

For low-latency applications, the DRX cycle and a start offset of a DRX cycle are to be time-aligned to downlink traffic arrivals. For example, the XR device may serve the user and, between video frames, enter a brief sleep state in a DRX cycle. The XR device and the edge server may attempt to align the uplink and downlink DRX cycles as part of connected DRX (CDRX). However, there are timing issues that can prevent successful use of CDRX. For example, an update rate (cadence of the updates) for controller and user pose information on the uplink may be more frequent than a cadence of downlink data. The higher cadence of the uplink updates may prevent some power saving features of CDRX, because each physical uplink shared channel (PUSCH) transmission can have a significant impact on power consumption, and the higher cadence may affect transition times for sleeping and waking during the CDRX cycle.

The XR device may also use bandwidth part (BWP) switching, which involves switching between parts of a frequency band. Using a part of a frequency band rather than the whole frequency band saves power. The XR device may be configured to use a high throughput BWP for downlink data and a low power BWP when there is no downlink data. If the cadence of the uplink updates is higher than what allows for transition times for switching BWPs, the XR device may not be able to apply power saving features. As a result, the XR device may consume more power, and a shorter battery life can affect the user experience.

As indicated above, FIG. 4 is provided as an example. Other examples may differ from what is described with regard to FIG. 4.

Figure 5:
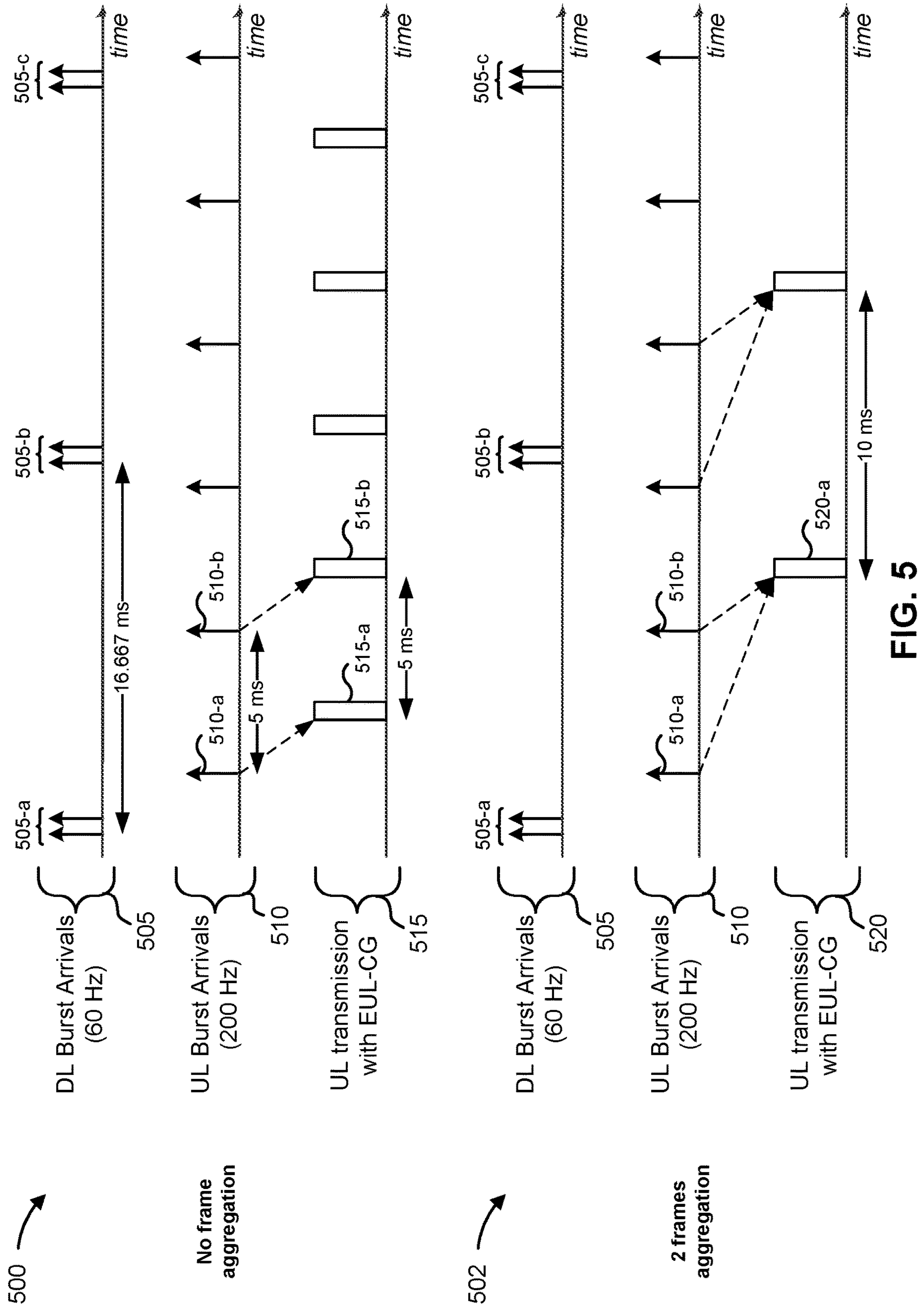
FIG. 5 illustrates examples of extended reality traffic periodicity, in accordance with the present disclosure.

FIG. 5 illustrates examples 500 and 502 of XR traffic periodicity, in accordance with the present disclosure. Examples 500 and 502 show downlink traffic burst arrivals 505 that include, for example, XR downlink traffic with a periodic pattern that corresponds to a frame rate of transmitted data (e.g., H.264/H.265 encoded video). The downlink traffic rate may be, for example, 60 Hz, thus resulting in a downlink traffic burst arrival periodicity of 16.667 ms. Examples 500 and 502 also show uplink traffic burst arrivals 510 (uplink frames) that are delivered from an application in the XR device to a modem of the XR device according to a periodic pattern. The XR device may transmit each uplink frame in an enhanced uplink (EUL) CG transmission 515.

According to various aspects described herein, a UE may aggregate uplink frames before transmitting the frames in an uplink transmission. Example 500 shows uplink transmissions without frame aggregation, where uplink frames 510-*a* and 510-*b* for an application are transmitted in respective uplink transmissions 515-*a* and 515-*b*. By contrast, as shown in example 502, uplink frames 510-*a* and 510-*b* are aggregated into one uplink transmission 520-*a*. Uplink frame aggregation may be one example of overlapping transmission occasions with power efficient opportunities. Power efficient opportunities may include opportunities to increase a time between uplink transmissions. In this way, the UE has additional opportunities to use power saving features, such as sleeping longer before waking up to transmit and reducing the quantity of uplink transmissions. The UE may also increase uplink capacity.

The UE may provide assistance information to the network to assist the network with helping the UE to save power. More specifically, a gNB may benefit from knowing the cadence and the offset of the uplink frames delivered by the application of the UE. For example, after the uplink XR traffic starts, the modem of the UE may learn the arrival times of the uplink frames, as delivered by the application. The UE may transmit the cadence and/or offset of the uplink frames to the gNB in assistance information. The UE may report the cadence and the offset of the uplink frames through new information elements (IEs) (e.g., ulTraffic-Cadence, ulTraffic-Offset) in a radio resource control (RRC) message (e.g., UEAssistanceInformation message). The offset may be defined in terms of system frame number, subframe number, and/or slot number. The gNB may determine to reconfigure the UE based at least in part on the cadence and/or offset of the uplink frames reported by the UE.

The gNB may generate an uplink transmission configuration for the UE that specifies when uplink transmission occasions are to occur, including for one or more uplink configured grants (CGs). The uplink transmission occasions may be spaced out such that multiple uplink frames are to be aggregated in an uplink transmission. The uplink transmission configuration may include an uplink CG with a cadence that corresponds to uplink transmissions that are spaced out for aggregated uplink frames. In other words, the gNB may adapt the cadence of uplink CGs to the cadence of the uplink transmissions of aggregated frames.

The uplink transmission configuration may apply to a scenario of a single uplink CG, where the cadence of the uplink transmissions is adapted to an optimal cadence calculated by the UE. $N_{uplink}$ may be an optimal quantity of uplink frames (as delivered by the application) that can be stored and aggregated before being transmitted on the air interface. $N_{stored}$ may be the quantity of uplink frames that have been delivered by the application, and which are stored, waiting for transmission on the air interface. The uplink transmission configuration may also apply to a scenario involving multiple uplink CGs, each uplink CG having its own cadence and offset. In other words, the UE may use uplink CGs, from among multiple available CGs, such that the cadence and offset of any used uplink CG matches an optimal cadence and offset calculated by the UE.

In some aspects, if the UE does not aggregate uplink frames, the UE may use the cadence and offset of the uplink frames to overlap uplink transmission occasions with other power efficient opportunities, such as ongoing downlink data reception occasions, a low power BWP, or CDRX ON-durations.

Whenever the UE calculates $N_{uplink}$, the UE may determine a preferred uplink CG cadence and offset that corresponds to $N_{uplink}$. If a single uplink CG is to be configured, the UE may use an RRC message or a MAC CE to suggest the preferred uplink CG cadence and offset. For example, the UE may use a new IE (e.g., preferredULCG-Cadence And-Offset) in an RRC message (e.g., UEAssistanceInformation message). Whenever the uplink CG cadence and/or offset, as calculated by the UE, are different from the latest reported cadence and offset, the UE may report the new values in the UEAssistanceInformation message. The gNB may configure the UE with an uplink transmission configuration, which may include the single uplink CG. Then, the gNB may reconfigure the uplink CG through an RRC reconfiguration procedure.

The UE may periodically calculate $N_{uplink}$ and thus the corresponding uplink CG cadence and offset may change frequently. If the RRC signaling is not optimal, the UE may suggest the preferred uplink CG cadence and offset through MAC signaling. Whenever the UE calculates a new value of $N_{uplink}$, the UE may determine a fractional ratio of the uplink CG cadence and offset that best matches $N_{uplink}$. If the new values of the ratio and/or the offset are different from the latest reported ones, the UE may report the new values through a new MAC CE (e.g., ULCG Cadence Ratio Offset Request) to the gNB. Possible values of the ratio and offsets may be obtained from stored configuration information (e.g., set by a standard). Ratios may include, for example, 1 (equal to the uplink CG cadence), ½ (uplink CG cadence/2), ⅓ (uplink CG cadence/3), 2 (uplink CG cadence*2), or 3 (uplink CG cadence*3). For example, the UE may be configured with a single uplink CG with a period of 5 ms. The UE may suggest a ratio of ½ such that the UE transmits an uplink frame every two uplink transmission occasions.

Upon reception of the ULCG Cadence Ratio Offset Request MAC CE, the gNB may signal the uplink CG cadence and offset through MAC signaling. The gNB may determine the actual ratio and offset to be used (which may be different from the suggested one), and if the ratio and/or offset are different from the latest ones signaled to the UE, the gNB may signal the new ratio through a new MAC CE (e.g., ULCG Cadence Ratio Offset Command).

If the gNB does not transmit the ULCG Cadence Ratio Offset Command MAC CE, both the gNB and the UE may continue using the latest signaled values of the ratio and offset. If the gNB does transmit the ULCG Cadence Ratio Offset Command MAC CE, both the gNB and the UE may start using the new values of the ratio and/or the offset from a common synchronization point, which may be, for example, the slot where a hybrid automatic repeat request (HARQ) acknowledgement (ACK) is transmitted in response to the reception of the MAC CE.

When the UE is configured with multiple uplink CGs, the UE may suggest, via an RRC message or a MAC CE, a preferred uplink CG (among all configured uplink CGs) through a new IE (e.g., preferredULCG) in the RRC UEAssistanceInformation message. The gNB may configure the UE with several uplink CGs, which may include the suggested uplink CG cadence and offset. Whenever the preferred uplink CG is different from the latest value reported in the UEAssistanceInformation message, the UE may report the new uplink CG in a new UEAssistanceInformation message. The gNB may then release the other uplink CGs through an RRC reconfiguration procedure.

If the change of an uplink frame cadence is too frequent, a MAC CE may be better than an RRC message. The UE may suggest a preferred uplink CG cadence and offset through MAC signaling. The gNB may configure the UE with several uplink CGs, and when the UE calculates a new value of $N_{uplink}$, the UE may determine uplink CGs (among configured CGs) that best matches $N_{uplink}$. If the preferred uplink CGs are different from the latest reported ones, the UE may report the new uplink CGs through a new MAC CE (e.g., ULCG Change Request) to the gNB. The MAC CE may contain several uplink CGs (e.g., from among 16 uplink CGs).

In some aspects, the gNB may activate and deactivate uplink CGs through MAC signaling. Upon reception of the ULCG Change Request MAC CE, the gNB may determine the actual uplink CGs to be used (which may be different from the suggested ones), and if the new set of uplink CGs is different from the latest one signaled to the UE, the gNB may signal the uplink CGs that are activated and/or the ones that are deactivated through a new MAC CE (e.g., ULCG Change Command). If the gNB does not transmit the ULCG Change Command MAC CE, both the NB and the UE may continue using the latest signaled uplink CGs. If the gNB does transmit the (I. (G Change Command MAC CE, both the gNB and the UE may activate and/or deactivate the uplink CGs signaled by the MAC CE from a common synchronization point, which may be the slot while the HARQ ACK is transmitted in response to the reception of the MAC CE.

In some aspects, the UE may transmit a buffer status report (BSR) to help the gNB with its scheduling decisions. In the BSR, the UE may report the amount of data waiting for transmission for each logical channel group. All data, up to packet data convergence protocol (PDCP) service data units (SDUs) for which no PDCP data protocol data units (PDUs) have been constructed, may be considered for the BSR. To assist the gNB with not allocating too many uplink resources when the UE does not wish to transmit data from the application, if $N_{stored}$ is less than $N_{uplink}$, all SDUs and PDUs that belong to the $N_{stored}$ frames may be excluded from the data volume calculation for the BSR. $N_{uplink}$ may be considered a threshold for using the stored SDUs and PDUs. The threshold may be satisfied when $N_{stored}$ is equal to or greater than $N_{uplink}$ and not satisfied when $N_{stored}$ is less than $N_{uplink}$.

By providing the cadence and offset for uplink frames at the UE (and/or a suggested cadence and offset), the UE may improve UE power saving for XR devices that use XR applications, thus enhancing the user experience. By aggregating uplink frames in uplink transmissions, the UE may reduce interference, as there are fewer PUSCH transmissions on uplink CGs. The UE may also increase the uplink capacity, especially in mmWave, as uplink transmissions are less frequent and unused uplink CGs may be allocated to other UEs.

As indicated above, FIG. 5 provides some examples. Other examples may differ from what is described with regard to FIG. 5.

Figure 6:
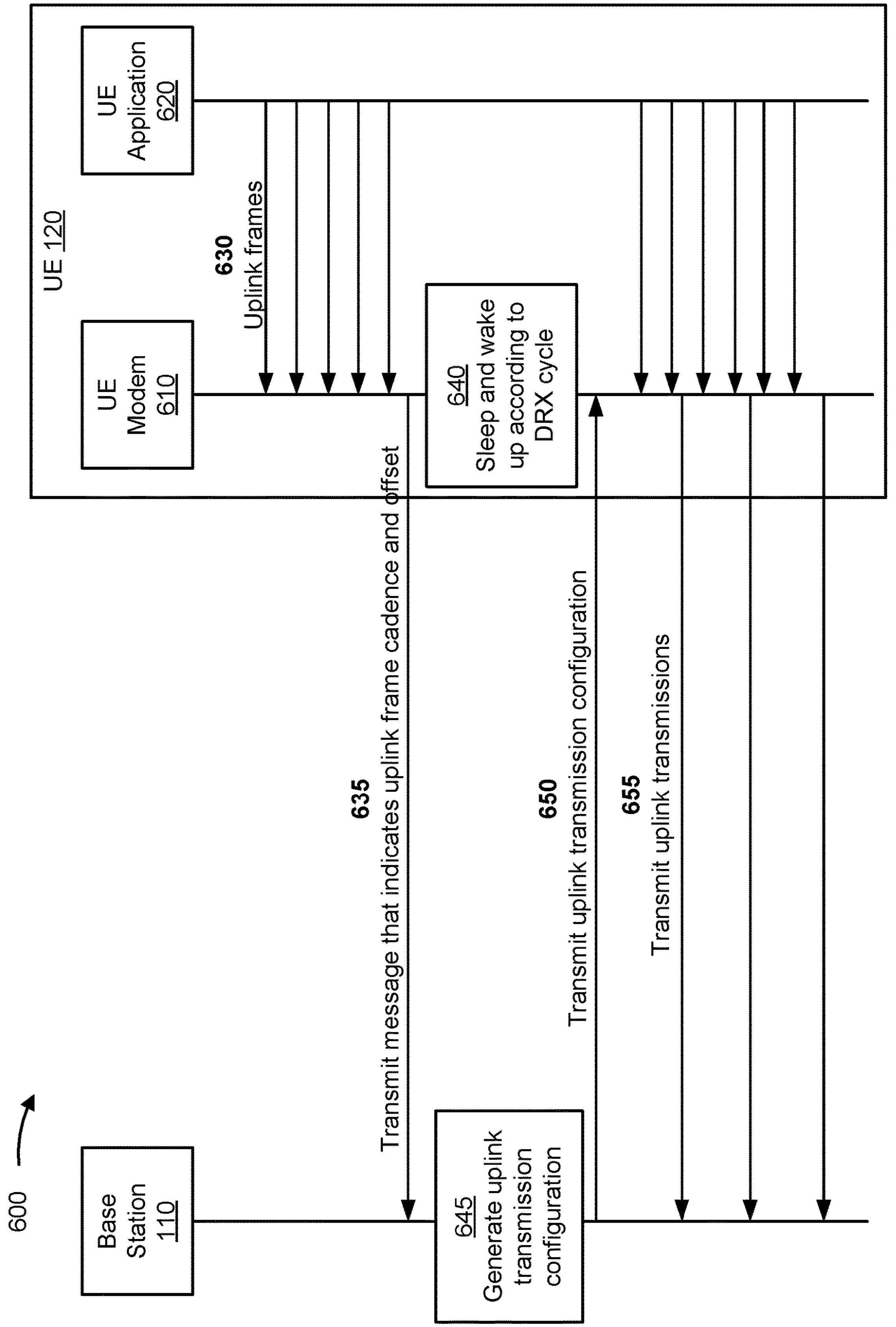
FIG. 6 illustrates an example of aggregating uplink frames in transmissions, in accordance with the present disclosure.

FIG. 6 illustrates an example 600 of aggregating uplink frames in transmissions, in accordance with the present disclosure.

FIG. 6 shows a base station (e.g., base station 110) and a UE (e.g., UE 120) that may communicate with each other. The UE 120 may include a UE modem 610 configured to transmit and receive communications, and a UE application component 620 that is configured to execute an application on the UE 120. The application may be an XR game that provides updates of the user position, user pose, and/or user status in uplink frames 630 to the UE modem 610 for transmission to the base station 110. The UE 120 may also receive downlink data (not shown in example 600). The UE modem 610 may store the uplink frames 630 for transmission in a buffer.

The UE 120 may determine a cadence of the uplink frames 630. The UE 120 may also determine an offset for each of the uplink frames 630. As shown by reference number 635, the UE 120 may transmit the cadence and the offset of the uplink frames 630. The UE 120 may transmit the cadence and the offset of the uplink frames 630 in a message, which may be an RRC message or a MAC CE. As shown by reference number 640, the UE 120 (or at least the UE modem 610) may sleep and wake according to a DRX cycle (e.g., a CDRX cycle). In some aspects, the UE 120 may also calculate an optimal uplink transmission cadence and/or an optimal uplink transmission offset, and the UE 120 may transmit the suggested cadence and/or offset in the message or in a separate message.

As shown by reference number 645, the base station 110 may generate an uplink transmission configuration, which may include a cadence of the uplink transmissions and an offset for the uplink transmissions. In some aspects, the base station 110 may use the suggested cadence and offset. In some aspects, the base station 110 may use a cadence and/or offset that is different than the suggested cadence or offset. As shown by reference number 650, the base station 110 may transmit the uplink transmission configuration to the UE 120.

As shown by reference number 655, the UE 120 may transmit uplink transmissions according to the uplink transmission configuration. The UE 120 may transmit the uplink transmissions such that they overlap with power efficient opportunities. If the power efficient opportunities include a low power BWP, the UE 120 may use uplink transmission occasions while the UE 120 is switched to the low power BWP. If the power efficient opportunities include CDRX ON-durations, the UE 120 may use uplink transmission occasions that occur during the CDRX ON-durations. If the power efficient opportunities include downlink data reception opportunities, the UE 120 may use uplink transmission occasions that occur while the UE 120 is awake to receive the downlink data transmission.

The power efficient opportunities may include uplink transmission occasions that aggregate uplink frames. In example 600, the UE 120 may aggregate two or more uplink frames in each uplink transmission. In this way, the UE 120 may use some power saving features that would otherwise not be available if an uplink transmission is used for each uplink frame.

As indicated above, FIG. 6 is provided as an example. Other examples may differ from what is described with regard to FIG. 6.

Figure 7:
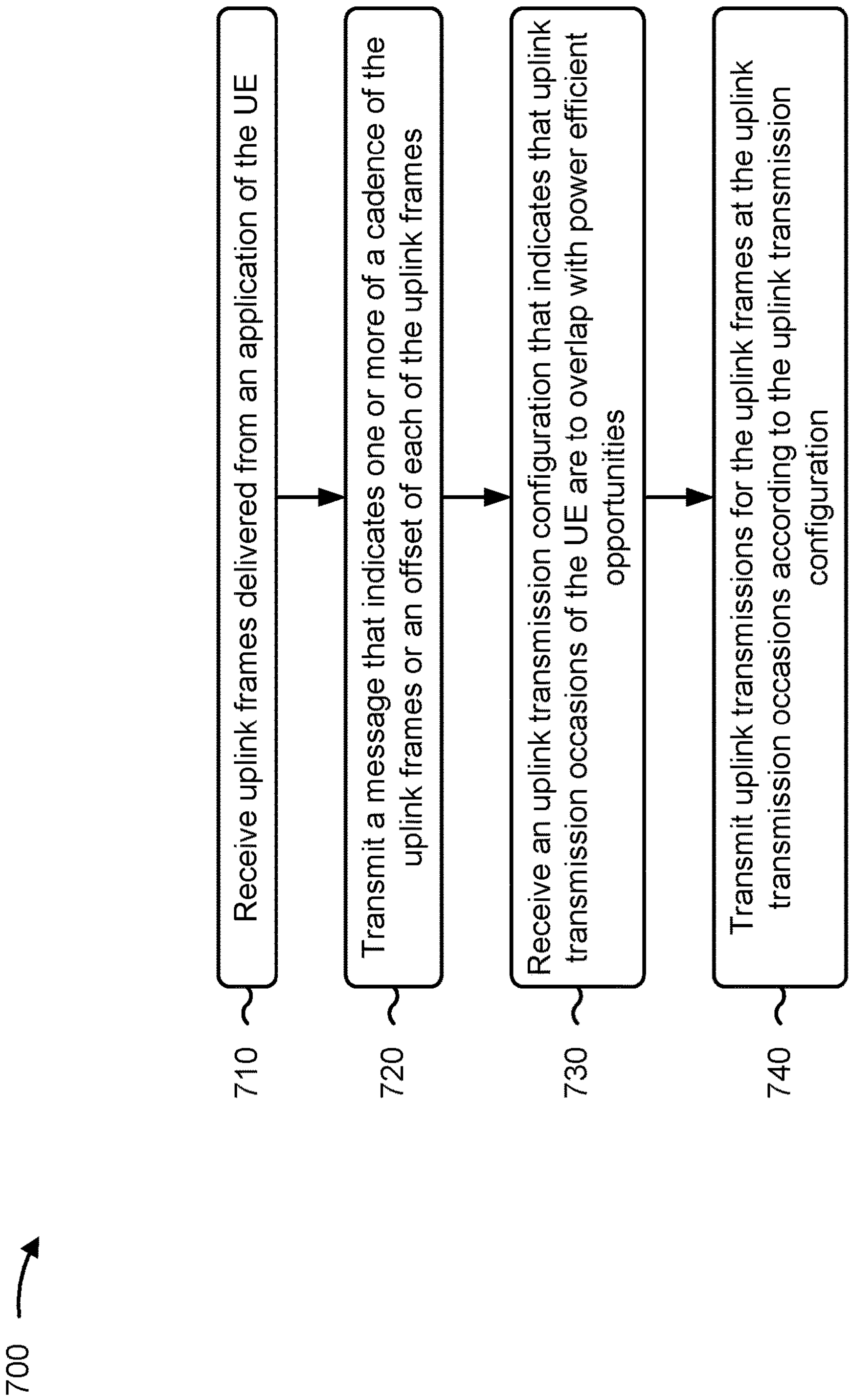
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with power efficient transmission occasions.

As shown in FIG. 7, in some aspects, process 700 may include receiving uplink frames delivered from an application of the UE (block 710). For example, the UE (e.g., using communication manager 140 and/or reception component 902 depicted in FIG. 9) may receive uplink frames delivered from an application of the UE, as described above.

As further shown in FIG. 7, in some aspects, process 700 may include transmitting a message that indicates one or more of a cadence of the uplink frames or an offset of each of the uplink frames (block 720). For example, the UE (e.g., using communication manager 140 and/or transmission component 904 depicted in FIG. 9) may transmit a message that indicates one or more of a cadence of the uplink frames or an offset of each of the uplink frames, as described above.

As further shown in FIG. 7, in some aspects, process 700 may include receiving an uplink transmission configuration that indicates that uplink transmission occasions of the UE are to overlap with power efficient opportunities (block 730). For example, the UE (e.g., using communication manager 140 and/or reception component 902 depicted in FIG. 9) may receive an uplink transmission configuration that indicates that uplink transmission occasions of the UE are to overlap with power efficient opportunities, as described above.

As further shown in FIG. 7, in some aspects, process 700 may include transmitting uplink transmissions for the uplink frames at the uplink transmission occasions according to the uplink transmission configuration (block 740). For example, the UE (e.g., using communication manager 140 and/or transmission component 904 depicted in FIG. 9) may transmit uplink transmissions for the uplink frames at the uplink transmission occasions according to the uplink transmission configuration, as described above.

Process 700 may include additional aspects, such as any single aspect or any combination of aspects described below and/or in connection with one or more other processes described elsewhere herein.

In a first aspect, the power efficient opportunities include downlink data reception occasions. In a second aspect, alone or in combination with the first aspect, the power efficient opportunities include transmission occasions in a low power bandwidth part. In a third aspect, alone or in combination with one or more of the first and second aspects, the power efficient opportunities include CDRX ON-durations.

In a fourth aspect, alone or in combination with one or more of the first through third aspects, the uplink transmission configuration indicates that the UE is to aggregate multiple uplink frames into an uplink transmission.

In a fifth aspect, alone or in combination with one or more of the first through fourth aspects, the uplink transmission configuration includes one or more of an uplink CG cadence that is based at least in part on the cadence of the uplink frames or an uplink CG offset that is based at least in part on the offset of each of the uplink frames.

In a sixth aspect, alone or in combination with one or more of the first through fifth aspects, the message includes one or more of a suggested uplink CG cadence for uplink transmission occasions that is based at least in part on the cadence of the uplink frames or a suggested uplink CG offset for uplink transmission occasions that is based at least in part on the offset of each of the uplink frames.

In a seventh aspect, alone or in combination with one or more of the first through sixth aspects, transmitting the message includes transmitting the message in an RRC message.

In an eighth aspect, alone or in combination with one or more of the first through seventh aspects, transmitting the message includes transmitting the message in a MAC CE.

In a ninth aspect, alone or in combination with one or more of the first through eighth aspects, the one or more of the suggested uplink CG cadence or the suggested uplink CG offset is for a single uplink CG.

In a tenth aspect, alone or in combination with one or more of the first through ninth aspects, the message includes multiple suggested uplink CG cadences or multiple suggested uplink CG offsets for multiple uplink CGs.

In an eleventh aspect, alone or in combination with one or more of the first through tenth aspects, receiving the uplink transmission configuration includes receiving the uplink transmission configuration in a MAC CE. In a twelfth aspect, alone or in combination with one or more of the first through eleventh aspects, the uplink transmission configuration indicates a ratio of a cadence of uplink transmission occasions in relation to the cadence of the uplink frames.

In a thirteenth aspect, alone or in combination with one or more of the first through twelfth aspects, the uplink transmission configuration is for a single uplink CG.

In a fourteenth aspect, alone or in combination with one or more of the first through thirteenth aspects, the uplink transmission configuration is for multiple uplink CGs.

In a fifteenth aspect, alone or in combination with one or more of the first through fourteenth aspects, the uplink transmission configuration activates or deactivates one or more uplink CGs.

In a sixteenth aspect, alone or in combination with one or more of the first through fifteenth aspects, the message includes a BSR that excludes stored SDUs and stored PDUs that are associated with stored uplink frames from a data volume calculation if a quantity of the stored uplink frames does not satisfy an uplink frame threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
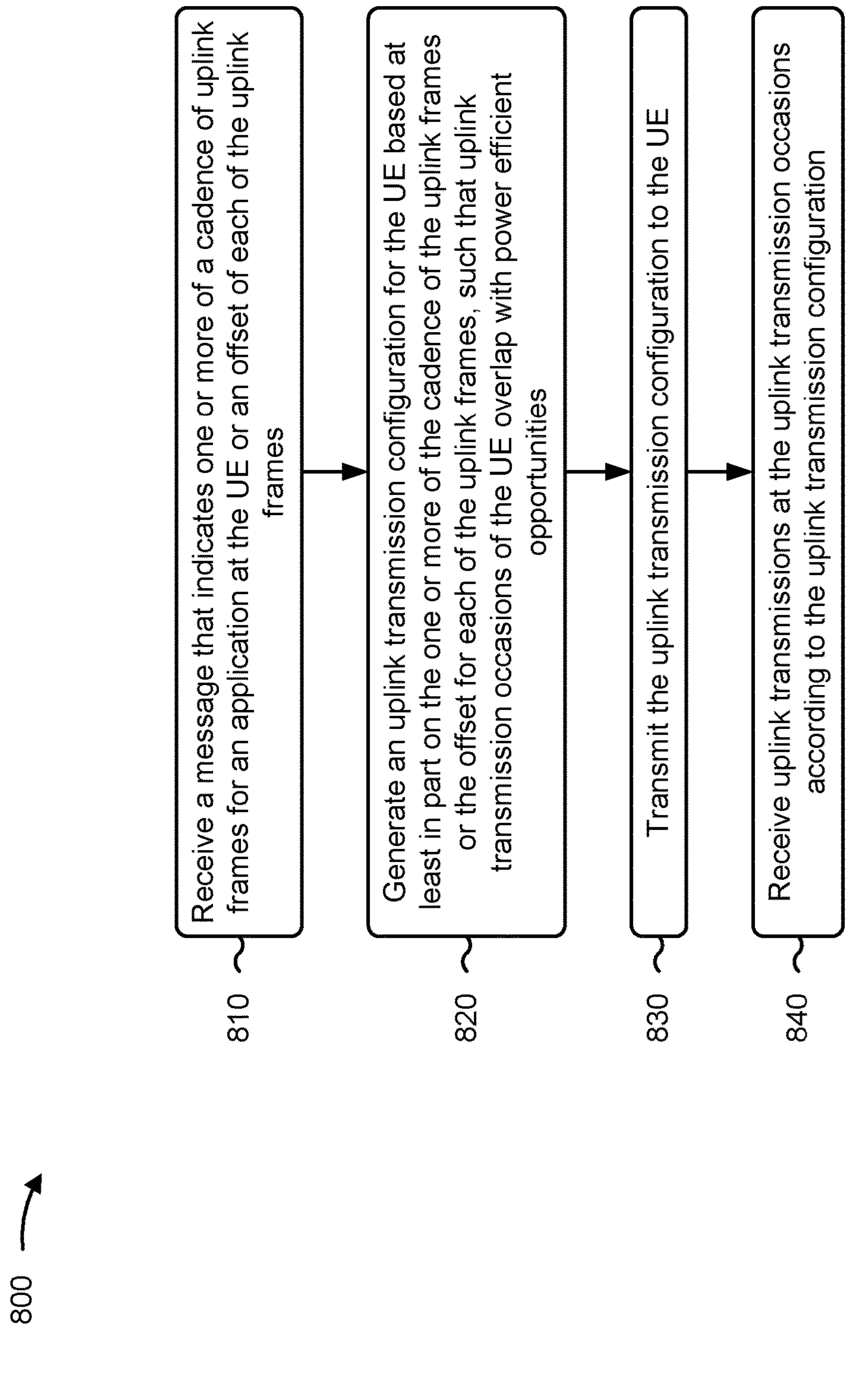
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110) performs operations associated with power efficient transmission occasions.

As shown in FIG. 8, in some aspects, process 800 may include receiving, from a UE, a message that indicates one or more of a cadence of uplink frames for an application of the UE or an offset of each of the uplink frames (block 810). For example, the base station (e.g., using communication manager 150 and/or reception component 1002 depicted in FIG. 10) may receive, from a UE, a message that indicates one or more of a cadence of uplink frames for an application of the UE or an offset of each of the uplink frames, as described above.

As further shown in FIG. 8, in some aspects, process 800 may include generating an uplink transmission configuration for the UE based at least in part on the one or more of the cadence of the uplink frames or the offset for each of the uplink frames, such that uplink transmission occasions of the UE overlap with power efficient opportunities (block 820). For example, the base station (e.g., using communication manager 150 and/or generation component 1008 depicted in FIG. 10) may generate an uplink transmission configuration for the UE based at least in part on the one or more of the cadence of the uplink frames or the offset for each of the uplink frames, such that uplink transmission occasions of the UE overlap with power efficient opportunities, as described above.

As further shown in FIG. 8, in some aspects, process 800 may include transmitting the uplink transmission configuration to the UE (block 830). For example, the base station (e.g., using communication manager 150 and/or transmission component 1004 depicted in FIG. 10) may transmit the uplink transmission configuration to the UE, as described above.

As further shown in FIG. 8, in some aspects, process 800 may include receiving uplink transmissions at the uplink transmission occasions according to the uplink transmission configuration (block 840). For example, the base station (e.g., using communication manager 150 and/or reception component 1002 depicted in FIG. 10) may receive uplink transmissions at the uplink transmission occasions according to the uplink transmission configuration, as described above.

Process 800 may include additional aspects, such as any single aspect or any combination of aspects described below and/or in connection with one or more other processes described elsewhere herein.

In a first aspect, the power efficient opportunities include one or more of downlink data reception occasions, transmission occasions in a low power bandwidth part, or connected discontinuous reception ON-durations.

In a second aspect, alone or in combination with the first aspect, the uplink transmission configuration indicates that the UE is to aggregate multiple uplink frames into an uplink transmission.

In a third aspect, alone or in combination with one or more of the first and second aspects, the uplink transmission configuration includes one or more of an uplink CG cadence that is based at least in part on the cadence of the uplink frames or an uplink CG offset that is based at least in part on the offset of each of the uplink frames.

In a fourth aspect, alone or in combination with one or more of the first through third aspects, the message includes one or more of a suggested uplink CG cadence for uplink transmission occasions that is based at least in part on the cadence of the uplink frames or a suggested uplink CG offset for uplink transmission occasions that is based at least in part on the offset of each of the uplink frames, and generating the uplink transmission configuration includes generating the uplink transmission configuration based at least in part on the one or more of the suggested uplink CG cadence or the suggested uplink CG offset.

In a fifth aspect, alone or in combination with one or more of the first through fourth aspects, receiving the message includes receiving the message in an RRC message.

In a sixth aspect, alone or in combination with one or more of the first through fifth aspects, receiving the message includes receiving the message in a MAC CE.

In a seventh aspect, alone or in combination with one or more of the first through sixth aspects, the one or more of the suggested uplink CG cadence or the suggested uplink CG offset is for a single uplink CG.

In an eighth aspect, alone or in combination with one or more of the first through seventh aspects, the message includes multiple suggested uplink CG cadences or multiple suggested uplink CG offsets for multiple uplink CGs.

In a ninth aspect, alone or in combination with one or more of the first through eighth aspects, transmitting the uplink transmission configuration includes transmitting the uplink transmission configuration in a MAC CE.

In a tenth aspect, alone or in combination with one or more of the first through ninth aspects, the uplink transmission configuration indicates a ratio of a cadence of uplink transmission occasions in relation to the cadence of the uplink frames.

In an eleventh aspect, alone or in combination with one or more of the first through tenth aspects, the uplink transmission configuration activates or deactivates one or more uplink CGs.

In a twelfth aspect, alone or in combination with one or more of the first through eleventh aspects, the message includes a BSR that excludes stored SDUs and stored PDUs that are associated with stored uplink frames from a data volume calculation if a quantity of the stored uplink frames does not satisfy an uplink frame threshold, and generating the uplink transmission configuration includes generating the uplink transmission configuration based at least in part on the BSR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
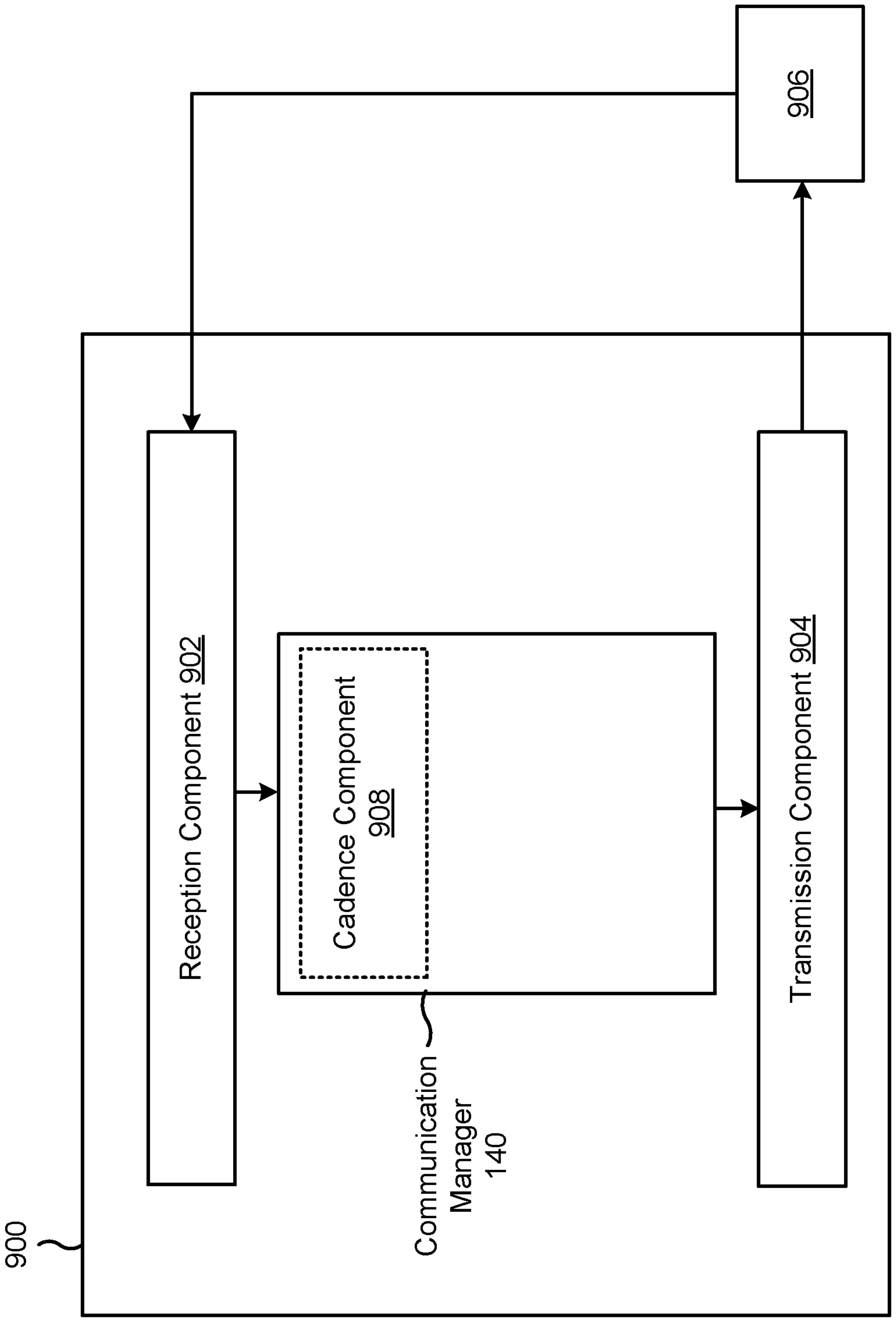
FIGS. 9-10 are diagrams of example apparatuses for wireless communication, in accordance with the present disclosure.

FIG. 9 is a diagram of an example apparatus 900 for wireless communication. The apparatus 900 may be a UE (e.g., UE 120), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may a cadence component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive uplink frames delivered from an application of the UE. The cadence component 908 may determine a cadence of the uplink frames or an offset of each of the uplink frames. The transmission component 904 may transmit a message that indicates the cadence of the uplink frames and/or the offset of each of the uplink frames. The reception component 902 may receive an uplink transmission configuration that indicates that uplink transmission occasions of the UE are to overlap with power efficient opportunities. The transmission component 904 may transmit uplink transmissions for the uplink frames at the uplink transmission occasions according to the uplink transmission configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
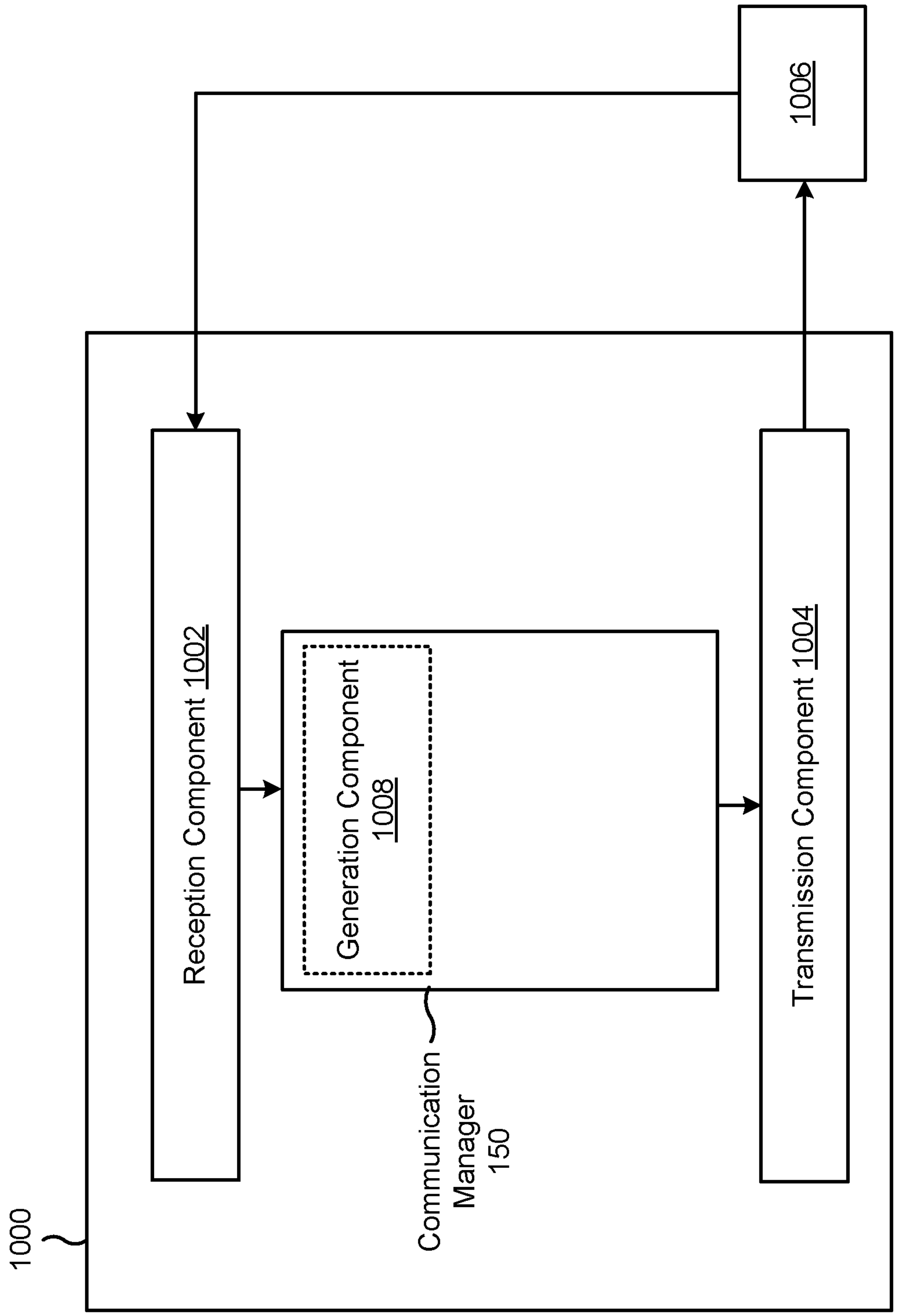

FIG. 10 is a diagram of an example apparatus 1000 for wireless communication. The apparatus 1000 may be a base station (e.g., base station 110), or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a generation component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive, from a UE, a message that indicates one or more of a cadence of uplink frames for an application of the UE or an offset of each of the uplink frames. The generation component 1008 may generate an uplink transmission configuration for the UE based at least in part on the one or more of the cadence of the uplink frames or the offset for each of the uplink frames, such that uplink transmission occasions of the UE overlap with power efficient opportunities. The transmission component 1004 may transmit the uplink transmission configuration to the UE. The reception component 1002 may receive uplink transmissions at the uplink transmission occasions according to the uplink transmission configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving uplink frames delivered from an application of the UE; transmitting a message that indicates one or more of a cadence of the uplink frames or an offset of each of the uplink frames; receiving an uplink transmission configuration that indicates that uplink transmission occasions of the UE are to overlap with power efficient opportunities; and transmitting uplink transmissions for the uplink frames at the uplink transmission occasions according to the uplink transmission configuration.

Aspect 2: The method of Aspect 1, wherein the power efficient opportunities include downlink data reception occasions.

Aspect 3: The method of Aspect 1 or 2, wherein the power efficient opportunities include transmission occasions in a low power bandwidth part.

Aspect 4: The method of any of Aspects 1-3, wherein the power efficient opportunities include connected discontinuous reception on durations.

Aspect 5: The method of any of Aspects 1-4, wherein the uplink transmission configuration indicates that the UE is to aggregate multiple uplink frames into an uplink transmission.

Aspect 6: The method of any of Aspects 1-5, wherein the uplink transmission configuration includes one or more of an uplink configured grant (CG) cadence that is based at least in part on the cadence of the uplink frames or an uplink CG offset that is based at least in part on the offset of each of the uplink frames.

Aspect 7: The method of any of Aspects 1-6, wherein the message includes one or more of a suggested uplink configured grant (CG) cadence for uplink transmission occasions that is based at least in part on the cadence of the uplink frames or a suggested uplink CG offset for uplink transmission occasions that is based at least in part on the offset of each of the uplink frames.

Aspect 8: The method of Aspect 7, wherein transmitting the message includes transmitting the message in a radio resource control message.

Aspect 9: The method of Aspect 7, wherein transmitting the message includes transmitting the message in a medium access control control element (MAC CE).

Aspect 10: The method of Aspect 9, wherein the one or more of the suggested uplink CG cadence or the suggested uplink CG offset is for a single uplink CG.

Aspect 11: The method of Aspect 9, wherein the message includes multiple suggested uplink CG cadences or multiple suggested uplink CG offsets for multiple uplink CGs.

Aspect 12: The method of any of Aspects 1-11, wherein receiving the uplink transmission configuration includes receiving the uplink transmission configuration in a medium access control control element (MAC CE).

Aspect 13: d method of Aspect 12, wherein the uplink transmission configuration indicates a ratio of a cadence of uplink transmission occasions in relation to the cadence of the uplink frames.

Aspect 14: The method of Aspect 12, wherein the uplink transmission configuration is for a single uplink configured grant.

Aspect 15: The method of Aspect 12, wherein the uplink transmission configuration is for multiple uplink configured grants.

Aspect 16: The method of Aspect 12, wherein the uplink transmission configuration activates or deactivates one or more uplink CGs.

Aspect 17: The method of any of Aspects 1-16, wherein the message includes a buffer status report that excludes stored service data units and stored protocol data units that are associated with stored uplink frames from a data volume calculation if a quantity of the stored uplink frames does not satisfy an uplink frame threshold.

Aspect 18: A method of wireless communication performed by a base station, comprising: receiving, from a user equipment (UE), a message that indicates one or more of a cadence of uplink frames for an application of the UE or an offset of each of the uplink frames; generating an uplink transmission configuration for the UE based at least in part on the one or more of the cadence of the uplink frames or the offset for each of the uplink frames, such that uplink transmission occasions of the UE overlap with power efficient opportunities; transmitting the uplink transmission configuration to the UE; and receiving uplink transmissions at the uplink transmission occasions according to the uplink transmission configuration.

Aspect 19: The method of Aspect 18, wherein the power efficient opportunities include one or more of downlink data reception occasions, transmission occasions in a low power bandwidth part, or connected discontinuous reception on durations.

Aspect 20: The method of Aspect 18 or 19, wherein the uplink transmission configuration indicates that the UE is to aggregate multiple uplink frames into an uplink transmission.

Aspect 21: The method of any of Aspects 18-20, wherein the uplink transmission configuration includes one or more of an uplink configured grant (CG) cadence that is based at least in part on the cadence of the uplink frames or an uplink CG offset that is based at least in part on the offset of each of the uplink frames.

Aspect 22: The method of any of Aspects 18-21, wherein the message includes one or more of a suggested uplink configured grant (CG) cadence for uplink transmission occasions that is based at least in part on the cadence of the uplink frames or a suggested uplink CG offset for uplink transmission occasions that is based at least in part on the offset of each of the uplink frames, and wherein generating the uplink transmission configuration includes generating the uplink transmission configuration based at least in part on the one or more of the suggested uplink CG cadence or the suggested uplink CG offset.

Aspect 23: The method of Aspect 22, wherein receiving the message includes receiving the message in a radio resource control message.

Aspect 24: The method of Aspect 22, wherein receiving the message includes receiving the message in a medium access control control element (MAC CE).

Aspect 25: The method of Aspect 24, wherein the one or more of the suggested uplink CG cadence or the suggested uplink CG offset is for a single uplink CG.

Aspect 26: The method of Aspect 24, wherein the message includes multiple suggested uplink CG cadences or multiple suggested uplink CG offsets for multiple uplink CGs.

Aspect 27: The method of any of Aspects 18-26, wherein transmitting the uplink transmission configuration includes transmitting the uplink transmission configuration in a medium access control control element (MAC CE).

Aspect 28: The method of Aspect 27, wherein the uplink transmission configuration indicates a ratio of a cadence of uplink transmission occasions in relation to the cadence of the uplink frames.

Aspect 29: The method of Aspect 27, wherein the uplink transmission configuration activates or deactivates one or more uplink CGs.

Aspect 30: The method of any of Aspects 18-29, wherein the message includes a buffer status report (BSR) that excludes stored service data units and stored protocol data units that are associated with stored uplink frames from a data volume calculation if a quantity of the stored uplink frames does not satisfy an uplink frame threshold, and wherein generating the uplink transmission configuration includes generating the uplink transmission configuration based at least in part on the BSR.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more antennas; and a processing system that includes one or more processors and one or more memories that store code for the one or more processors, the processing system configured to cause the UE to:

receive uplink frames delivered from an application of the UE;

transmit a message that indicates one or more of a cadence of the uplink frames or an offset of each of the uplink frames;

receive an uplink transmission configuration that indicates that uplink transmission occasions of the UE are to overlap with and occur during power efficient opportunities, wherein the power efficient opportunities include transmission occasions in a low power bandwidth part (BWP), wherein the uplink transmission occasions are to occur while the UE is switched to the low power BWP; and transmit uplink transmissions for the uplink frames at the uplink transmission occasions according to the uplink transmission configuration.

2. The UE of claim 1, wherein the power efficient opportunities include downlink data reception occasions.

3. The UE of claim 2, wherein the uplink transmission occasions are to occur while the UE is awake to receive downlink data transmission.

4. The UE of claim 1, wherein the power efficient opportunities include connected discontinuous reception (CDRX) on durations.

5. The UE of claim 1, wherein the uplink transmission configuration indicates that the UE is to aggregate multiple uplink frames into an uplink transmission.

6. The UE of claim 1, wherein the uplink transmission configuration includes one or more of an uplink configured grant (CG) cadence that is based at least in part on the cadence of the uplink frames or an uplink CG offset that is based at least in part on the offset of each of the uplink frames.

7. The UE of claim 1, wherein the message includes one or more of a suggested uplink configured grant (CG) cadence for uplink transmission occasions that is based at least in part on the cadence of the uplink frames or a suggested uplink CG offset for uplink transmission occasions that is based at least in part on the offset of each of the uplink frames.

8. The UE of claim 7, wherein the processing system, to transmit the message, is configured to cause the UE to transmit the message in a radio resource control message.

9. The UE of claim 7, wherein the processing system, to transmit the message, is configured to cause the UE to transmit the message in a medium access control control element (MAC CE).

10. The UE of claim 9, wherein the one or more of the suggested uplink configured grant (CG) cadence or the suggested uplink CG offset is for a single uplink CG.

11. The UE of claim 9, wherein the message includes multiple suggested uplink configured grant (CG) cadences or multiple suggested uplink CG offsets for multiple uplink CGs.

12. The UE of claim 1, wherein the processing system, to receive the uplink transmission configuration, is configured to cause the UE to receive the uplink transmission configuration in a medium access control control element (MAC CE).

13. The UE of claim 12, wherein the uplink transmission configuration indicates a ratio of a cadence of uplink transmission occasions in relation to the cadence of the uplink frames.

14. The UE of claim 12, wherein the uplink transmission configuration is for a single uplink configured grant (CG).

15. The UE of claim 12, wherein the uplink transmission configuration is for multiple uplink configured grants (CGs).

16. The UE of claim 12, wherein the uplink transmission configuration activates or deactivates one or more uplink configured grants (CGs).

17. The UE of claim 1, wherein the message includes a buffer status report that excludes stored service data units and stored protocol data units that are associated with stored uplink frames from a data volume calculation if a quantity of the stored uplink frames does not satisfy an uplink frame threshold.

18. A base station for wireless communication, comprising:

one or more memories; and a processing system that includes one or more processors and one or more memories that store code for the one or more processors, the processing system configured to cause the base station to:

receive, from a user equipment (UE), a message that indicates one or more of a cadence of uplink frames for an application of the UE or an offset of each of the uplink frames;

generate an uplink transmission configuration for the UE based at least in part on the one or more of the cadence of the uplink frames or the offset for each of the uplink frames, such that uplink transmission occasions of the UE overlap with and occur during power efficient opportunities, wherein the power efficient opportunities include transmission occasions in a low power bandwidth part (BWP), wherein the uplink transmission occasions are to occur while the UE is switched to the low power BWP;

transmit the uplink transmission configuration to the UE; and receive uplink transmissions at the uplink transmission occasions according to the uplink transmission configuration.

19. The base station of claim 18, wherein the power efficient opportunities include one or more of downlink data reception occasions or connected discontinuous reception (CDRX) on durations.

20. The base station of claim 18, wherein the uplink transmission configuration indicates that the UE is to aggregate multiple uplink frames into an uplink transmission.

21. The base station of claim 18, wherein the uplink transmission configuration includes one or more of an uplink configured grant (CG) cadence that is based at least in part on the cadence of the uplink frames or an uplink CG offset that is based at least in part on the offset of each of the uplink frames.

22. The base station of claim 18, wherein the message includes one or more of a suggested uplink configured grant (CG) cadence for uplink transmission occasions that is based at least in part on the cadence of the uplink frames or a suggested uplink CG offset for uplink transmission occasions that is based at least in part on the offset of each of the uplink frames, and wherein the processing system, to generate the uplink transmission configuration, is configured to cause the base station to generate the uplink transmission configuration based at least in part on the one or more of the suggested uplink CG cadence or the suggested uplink CG offset.

23. The base station of claim 22, wherein the processing system, to receive the message, is configured to cause the base station to receive the message in a radio resource control message.

24. The base station of claim 22, wherein the processing system, to receive the message, is configured to cause the base station to receive the message in a medium access control control element (MAC CE).

25. The base station of claim 24, wherein the one or more of the suggested uplink CG cadence or the suggested uplink CG offset is for a single uplink CG.

26. The base station of claim 24, wherein the message includes multiple suggested uplink CG cadences or multiple suggested uplink CG offsets for multiple uplink CGs.

27. The base station of claim 18, wherein the processing system, to transmit the uplink transmission configuration, is configured to cause the base station to transmit the uplink transmission configuration in a medium access control control element (MAC CE).

28. The base station of claim 27, wherein the uplink transmission configuration indicates a ratio of a cadence of uplink transmission occasions in relation to the cadence of the uplink frames.

29. The base station of claim 27, wherein the uplink transmission configuration activates or deactivates one or more uplink configured grants (CGs).

30. The base station of claim 18, wherein the message includes a buffer status report (BSR) that excludes stored service data units and stored protocol data units that are associated with stored uplink frames from a data volume calculation if a quantity of the stored uplink frames does not satisfy an uplink frame threshold, and wherein the processing system, to generate the uplink transmission configuration, is configured to cause the base station to generate the uplink transmission configuration based at least in part on the BSR.

* * * * *